US010807078B2

(12) United States Patent
Eid et al.

(10) Patent No.: US 10,807,078 B2
(45) Date of Patent: Oct. 20, 2020

(54) METHOD OF SYNTHESIS OF NANO-SIZED BETA ZEOLITES CONTAINING MESOPORES AND USES THEREOF

(71) Applicant: Saudi Arabian Oil Company, Dhahran (SA)

(72) Inventors: Manal Eid, Dhahran (SA); Lianhui Ding, Dhahran (SA); Kareemuddin Shaik, Dhahran (SA)

(73) Assignee: SAUDI ARABIAN OIL COMPANY (SA)

( * ) Notice: Subject to any disclaimer, the term of this patent is extended or adjusted under 35 U.S.C. 154(b) by 0 days.

(21) Appl. No.: 16/194,955

(22) Filed: Nov. 19, 2018

(65) Prior Publication Data

US 2020/0156052 A1 May 21, 2020

(51) Int. Cl.

| | | |
|---|---|---|
| *C01B 39/48* | (2006.01) | |
| *B01J 29/70* | (2006.01) | |
| *B01J 35/00* | (2006.01) | |
| *B01J 37/00* | (2006.01) | |
| *B01J 37/02* | (2006.01) | |
| *B01J 37/03* | (2006.01) | |
| *B01J 37/06* | (2006.01) | |
| *B01J 37/10* | (2006.01) | |
| *C10G 47/20* | (2006.01) | |
| *B01J 35/10* | (2006.01) | |
| *B01J 29/04* | (2006.01) | |

(52) U.S. Cl.
CPC ......... *B01J 29/7007* (2013.01); *B01J 29/041* (2013.01); *B01J 35/0013* (2013.01); *B01J 35/109* (2013.01); *B01J 35/1057* (2013.01); *B01J 35/1061* (2013.01); *B01J 37/0018* (2013.01); *B01J 37/0236* (2013.01); *B01J 37/036* (2013.01); *B01J 37/06* (2013.01); *B01J 37/10* (2013.01); *C01B 39/48* (2013.01); *C10G 47/20* (2013.01); *C01P 2004/64* (2013.01)

(58) Field of Classification Search
CPC ..... C01B 39/48; C01P 2004/64; B01J 29/041; B01J 29/7007; B01J 35/109; B01J 35/1057; B01J 35/1061; B01J 37/0236
See application file for complete search history.

(56) References Cited

U.S. PATENT DOCUMENTS

| | | | |
|---|---|---|---|
| 10,118,163 B1* | 11/2018 | Zhang | .................. B01J 35/1038 |
| 2002/0018747 A1 | 2/2002 | Pinnavaia et al. | |
| 2006/0264318 A1* | 11/2006 | Shan | ...................... B01J 29/005 |
| | | | 502/60 |
| 2008/0214882 A1 | 9/2008 | Pinnavaia et al. | |
| 2013/0299389 A1 | 11/2013 | Garcia-Martinez | |
| 2017/0190587 A1 | 7/2017 | Li et al. | |
| 2018/0311652 A1* | 11/2018 | Zhang | .................... B01J 35/109 |

FOREIGN PATENT DOCUMENTS

| | | |
|---|---|---|
| EP | 1108678 B1 | 10/2003 |
| WO | 2018204057 A1 | 11/2018 |

OTHER PUBLICATIONS

S. P. Naik, et al., "Mesoporous silica with short-range MFI structure," Microporous and Mesoporous Materials, 60: 213-224 (2003).
Bagshaw et al., "Highly ordered mesoporous MSU-Sbea/zeolite Beta composite material", Journal of Materials Chemistry, 2006, pp. 2235-2244, The Royal Society of Chemistry.
Camblor et al., "Characterization of nanocrystalline zeolite Beta", Microporous and Mesoporous Materials, 1998, pp. 59-74, Elsevier.
Ding et al., "Effect of agitation on the synthesis of zeolite beta and its synthesis mechanism in absence of alkali cations", Microporous and Mesoporous Materials, 2006, pp. 1-8, Elsevier.
International Search Report and Written Opinion for related PCT application PCT/US2019/062031 dated Feb. 21, 2020. (SA5799).
Zhang et al., "A Feasible One-Step Synthesis of Hierarchical Zeolite Beta with Uniform Nanocrystals via CTAB", MDPI, 2018, pp. 11.

* cited by examiner

*Primary Examiner* — David M Brunsman
(74) *Attorney, Agent, or Firm* — Bracewell LLP; Constance Gall Rhebergen

(57) ABSTRACT

A method for synthesizing a nano-sized mesoporous zeolite composition, comprising: mixing silica, a source of aluminum, and tetraethylammonium hydroxide to form an aluminosilicate fluid gel; drying the aluminosilicate fluid gel to form a dried gel mixture; subjecting the dried gel mixture to hydrothermal treatment to produce a zeolite precursor; adding cetyltrimethylammonium bromide (CTAB) to the zeolite precursor to form a templated mixture; subjecting the templated mixture to hydrothermal treatment to prepare a CTAB-templated zeolite.

9 Claims, No Drawings

METHOD OF SYNTHESIS OF NANO-SIZED BETA ZEOLITES CONTAINING MESOPORES AND USES THEREOF

TECHNICAL FIELD

The disclosure relates to nano-sized mesoporous zeolite compositions and the methods of synthesis and use of these compositions.

BACKGROUND

Beta zeolites are crystallized aluminosilicates that are widely used in heavy oil conversion processes such as hydrocracking and fluid catalytic cracking processes. The feedstock to these processes is a portion of the crude oil that has an initial boiling point of 350 Celsius (° C.) and an average molecular weight ranging from about 200 to 600 or greater. Macroporous materials have pores size distributions between 50 and 1000 nanometers (nm). Mesoporous materials have an intermediate pore size distributions, between 2-50 nm. And, microporous materials exhibit pore size distributions in the range of 0.5-2 nm. Conventional beta zeolites have pore sizes (<2 nm) that do not allow the large molecules to diffuse in and to react on the active sites located inside the zeolites. These conventional beta zeolites have an intrinsic limit on their pore dimension and accessibility owing to the pore templates available for their synthesis.

SUMMARY

Various embodiments of this disclosure were developed to address these shortcomings in the art. Increase of the pore sizes and reduction of the particle sizes of the zeolites are two effective ways to enhance the mass transfer, and thus improve performances of the zeolite catalysts. Certain embodiments disclosed and described here include methods of synthesizing nano-sized mesoporous zeolite compositions. One such method includes the steps of mixing silica, a source of aluminum, and tetraethylammonium hydroxide to form an aluminosilicate fluid gel, and drying the aluminosilicate fluid gel to form a dried gel mixture. In the next step, the dried gel mixture is subject to hydrothermal treatment to produce a zeolite precursor. In certain embodiments, the dried gel mixture is subject to hydrothermal treatment in an autoclave at a temperature ranging from 100° C. to 150° C. under constant rotation to produce a zeolite precursor. In the next step, a template or a structure directing agent, such as cetyltrimethylammonium bromide (CTAB) is added to the zeolite precursor to form a templated mixture, and the templated mixture is subject to hydrothermal treatment to prepare a templated zeolite. The templated zeolites are washed with distilled water and then subject to a separation process, such as filtration or centrifugation. The templated zeolites are then subject to additional drying and calcination to produce a nano-sized mesoporous zeolite composition. In certain embodiments, the silica is fumed silica. In certain embodiments, the silica is colloidal silica. In certain embodiments, the source of aluminum is aluminum powder. In certain embodiments, the source of aluminum is aluminum oxide. In certain embodiments, the zeolite composition is a mesoporous beta zeolite in a proton form. In certain embodiments, the zeolite composition has a pore size between 2 and 60 nanometers and a particle size of less than 100 nanometers. The zeolite composition can have an average pore size of 60 nanometers and a particle size of less than 60 nanometers.

Certain embodiments disclosed and described here include methods for hydrocracking a hydrocarbon feedstock using nano-sized mesoporous zeolite compositions. One such method includes the steps of contacting the hydrocarbon feedstock with a catalyst containing a nano-sized mesoporous zeolite composition under reaction conditions to produce a product stream containing at least 20 weight percent of hydrocarbons with one to four carbon atoms. The reaction conditions can include a temperature ranging from 250° C. to 420° C., a liquid hourly space velocity ranging from 0.5 per hour to 10 per hour, and a hydrogen to oil volume ratio ranging from 500 to 2000. The nano-sized mesoporous zeolite composition used in the hydrocracking process is produced by a method including the steps of mixing silica, a source of aluminum, and tetraethylammonium hydroxide to form an aluminosilicate fluid gel, and drying the aluminosilicate fluid gel to form a dried gel mixture. In the next step, the dried gel mixture is subject to hydrothermal treatment to produce a zeolite precursor. In certain embodiments, the dried gel mixture is subject to hydrothermal treatment in an autoclave at a temperature ranging from 100° C. to 150° C. under constant rotation to produce a zeolite precursor. In the next step, a template or a structure directing agent, such as cetyltrimethylammonium bromide (CTAB) is added to the zeolite precursor to form a templated mixture, and the templated mixture is subject to hydrothermal treatment to prepare a templated zeolite. The templated zeolites are washed with distilled water and then subject to a separation process, such as filtration or centrifugation. The templated zeolites are then subject to additional drying and calcination to produce a nano-sized mesoporous zeolite composition. In certain embodiments, the hydrocarbon feedstock has at least 70 weight percent of components with a boiling point ranging from 180° C.-540° C. In certain embodiments, the silica is fumed silica. In certain embodiments, the silica is colloidal silica. In certain embodiments, the source of aluminum is aluminum powder. In certain embodiments, the source of aluminum is aluminum oxide. In certain embodiments, the zeolite composition is a mesoporous beta zeolite in a proton form. In certain embodiments, the zeolite composition has a pore size between 2 and 60 nanometers and a particle size of less than 100 nanometers. The zeolite composition can have an average pore size of 20 nanometers and a particle size of less than 60 nanometers.

Numerous other aspects, features and benefits of the present disclosure may be made apparent from the following detailed description taken together with the drawings. The methods can include other steps or different components depending on desired goals.

DETAILED DESCRIPTION

The present disclosure describes various embodiments related to nano-sized mesoporous zeolite compositions and methods of synthesis of these compositions.

In the following description, numerous details are set forth in order to provide a thorough understanding of the various embodiments. In other instances, well-known processes, devices, and systems may not been described in particular detail in order not to unnecessarily obscure the various embodiments. Additionally, illustrations of the various embodiments may omit certain features or details in order to not obscure the various embodiments.

In the following detailed description, reference is made to the accompanying drawings that form a part of this disclosure. Like numerals may designate like parts throughout the drawings. The drawings may provide an illustration of some of the various embodiments in which the subject matter of the present disclosure may be practiced. Other embodiments may be utilized, and logical changes may be made without departing from the scope of this disclosure.

The description may use the phrases "in some embodiments," "in various embodiments," "in an embodiment," or "in embodiments," which may each refer to one or more of the same or different embodiments. Furthermore, the terms "comprising," "including," "having," and the like, as used with respect to embodiments of the present disclosure, are synonymous.

Crude oil is passed through hydro-treating and then hydrocracking catalysts to remove undesired contents, such as sulfur, nitrogen, and metals, and convert high molecular weight hydrocarbons (complex aromatics or unsaturated hydrocarbons) into naphtha, kerosene, gasoline, diesel oil or high-quality lubricating oils. The catalyst used in hydroprocessing has two functions: cracking of high molecular weight hydrocarbons and hydrogenating the unsaturated molecules. However, the small pore size of the most widely used zeolites in hydrocracking catalysts (zeolite beta and Y) has a negative impact on the performance of the catalyst by preventing the large molecules in the heavy oil fraction from diffusing into the active sites located inside the zeolites. This leads to decreased activity of the catalysts and a possible deactivation of the catalysts. The poor diffusion efficiency of the large molecules can be mitigated by either increasing the pore size of the zeolite catalysts, or reducing the particle size of the zeolite catalysts, or combining both features. Disclosed here are ordered mesoporous zeolite compositions with pore size between 2 and 60 nm and a particle size of less than 100 nm. Reduction in particle size during the synthesis of the zeolite catalysts impacts the performance of the zeolite catalysts by increasing the external surface area of the catalyst and shortening the diffusion path of the reactants and products.

Conventional hydrothermal synthesis of nano-sized beta zeolites suffers from a number of problems associated with the presence of alkali cations during the preparation, including irregularity of the zeolite catalyst resulting from aggregation of the nano-sized particles and decreased yield of final products due to the need for ion exchange and separation steps to obtained H-form zeolite product or protonic zeolite forms. Current techniques to overcome the irregularity problem include introduction of a steaming step to a mixture of nano-sized precursors and a micelle solution containing structure directing agents (SDA) or hot alkaline treatments. By controlling SDA concentrations and temperature during the synthesis, nano-sized zeolite particles with ordered mesoporosity were produced. These techniques also include the use of ethanolic surfactant solutions for flocculation and this leads to the need for a subsequent filtration process to separate the zeolites.

Certain embodiments disclosed and described here include methods for hydrocracking a hydrocarbon feedstock using nano-sized mesoporous zeolite compositions. One such method includes the steps of contacting the hydrocarbon feedstock with a catalyst containing a nano-sized mesoporous zeolite composition under reaction conditions to produce a product stream containing at least 15 weight percent of hydrocarbons with one to four carbon atoms. In certain embodiments, the product stream can contain at least 20 weight percent of hydrocarbons with one to four carbon atoms. In certain embodiments, the product stream can contain at least 22 weight percent of hydrocarbons with one to four carbon atoms. The reaction conditions can include a temperature ranging from 250° C. to 420° C., a liquid hourly space velocity ranging from 0.5 per hour to 10 per hour, and a hydrogen to oil volume ratio ranging from 500 to 2000. The reaction conditions can include a temperature ranging from 250° C. to 400° C., or from 250° C. to 375° C., or from 300° C. to 420° C., or from 325° C. to 400° C. The reaction conditions can include a liquid hourly space velocity ranging from 0.5 per hour to 8 per hour, or from 0.5 per hour to 5 per hour, or from 0.5 per hour to 2 per hour. The reaction conditions can include a hydrogen to oil volume ratio ranging from 500 to 1800, or from 500 to 1500, or from 700 to 1800, or from 700 to 1500. In certain embodiments, the hydrocarbon feedstock has at least 60 weight percent of components with a boiling point ranging from 180° C.-540° C. In certain embodiments, the hydrocarbon feedstock has at least 70 weight percent of components with a boiling point ranging from 180° C.-540° C. In certain embodiments, the hydrocarbon feedstock has at least 80 weight percent of components with a boiling point ranging from 180° C.-540° C.

Disclosed here are specific methods of synthesis of these nano-sized mesoporous zeolite compositions. These compositions are synthesized from a mixture of fumed or colloidal silica with aluminum powder or alumina. The methods do not include the use of aluminum or silica salts to form the zeolite precursors. In an embodiment, the beta zeolite compositions are synthesized by selecting appropriate sources of silicon and aluminum and implementing a dry gel conversion method. The beta zeolite compositions can be H-form mesoporous nano-sized beta zeolites. The zeolite composition combines the advantages of mesoporous materials and nano-sized particles. In this method, there is no introduction of sodium ions or other impurities. And, this method also eliminates the need for a subsequent ion-exchange step, such as an exchange of ammonium ions. The dry gel conversion improves the efficiency of synthesis and product yields. In certain embodiments, the particle size of the resulting zeolite composition is less than 100 nm. In certain embodiments, the particle size of the resulting zeolite composition is less than 60 nm. In certain embodiments, greater than forty percent (40%) of the pores are mesoporous with an average pore size can be up to 20 nm. In certain embodiments, greater than forty percent (40%) of the pores are mesoporous with an average pore size can be up to 50 nm. In certain embodiments, greater than forty percent (40%) of the pores are mesoporous with an average pore size can be up to 80 nm.

In certain embodiments, the method of synthesis of the beta zeolite compositions includes the following steps. A silica source is added to an aqueous mixture of aluminum powder and tetraethylammonium hydroxide to form an aluminosilicate fluid gel. The aluminosilicate fluid gel is subjected to a drying process to form a dry gel. The drying process includes evaporation of the liquid components of the aluminosilicate fluid gel at a temperature ranging from 90° C. to 110° C. for 24 to 48 hours to form a dry gel. This dry gel is hydrothermally treated in an autoclave under static or rotation conditions with temperatures ranging from 100° C. to 150° C. for 1 to 7 days to form a zeolite precursor. The zeolite precursor is mixed with aqueous solution of CTAB and transferred to a polytetrafluoroethylene (PTFE)-lined stainless steel autoclave, and allowed to crystallize at temperatures ranging from 100° C. to 150° C. for 1-7 days without stirring to form the nano-sized mesoporous beta zeolite product. In an embodiment, the CTAB-templated mixture is allowed to crystallize at 140° C. for 2 days without stirring.

A structure directing agent like cetyl-trimethylammonium bromide is added to the dried zeolite precursor to form a CTAB-templated mixture. This mixture is subsequently transferred to an autoclave to prepare a CTAB-templated zeolite. The CTAB-templated zeolite is washed with distilled water. The CTAB-templated zeolite is separated from the water by a separation method, such as filtration or centrifugation. The CTAB-templated zeolite is then subjected to drying and calcination to produce a nano-sized mesoporous zeolite composition. The nano-sized zeolite compositions are in a proton form.

In an embodiment, the silica source is fumed silica. In another embodiment, the silica source is colloidal silica. Use of these silica sources instead of alkali salts of silica, and use of aluminum powder or alumina instead of the alkali salts of aluminum, eliminates the need for a subsequent ion exchange step and leads to the direct formation of the beta zeolite product. Moreover, in embodiments implementing the two-step drying process, almost all water is removed before the dried aluminosilicate product is transferred for treatment in the autoclave. Therefore, for a particular volume in the autoclave, greater quantity of the dried aluminosilicate product can be treated.

Conventional methods of preparation of nano-sized zeolites include the use of ethanol or an ethanolic surfactant solution to harvest the zeolite precursors and these conditions include longer stirring time with no adjustment of pH. This leads to the formation of flocculants that have to be filtered before subsequent processing. During the filtration process, a considerable amount of silica and aluminum species are removed. So, a subsequent hydrothermal treatment results in a localized formation of zeolites. The crystallinity of the zeolite decreases, and most of them are amorphous materials (not zeolite). In embodiments of the methods disclosed here, the first step is the formation of the zeolite precursor building units as the aluminosilicate gel. There is no separation step, so all silica and aluminum species remain in the system. After the hydrothermal treatment, almost all silica and aluminum were converted to beta zeolite.

Properties of the nano-sized zeolite compositions include a particle size ranging from 10 nm to 100 nm. In some embodiments, the nano-sized zeolite compositions have a particle size ranging from 10 nm to 80 nm. In some embodiments, the nano-sized zeolite compositions have a particle size ranging from 10 nm to 60 nm. The surface area of the nano-sized zeolite particles can range from 500 square meters per gram ($m^2/g$) to 800 $m^2/g$. The pore volume of the nano-sized zeolite particles can range from 0.5 milliters per gram (ml/g) to 1.2 ml/g. The pore sizes of the nano-sized zeolite compositions can range from 5 nm to 60 nm. The pore sizes of the nano-sized zeolite compositions can range from 15 nm to 40 nm. In an embodiment, the average pore size of the nano-sized zeolite compositions can be 20 nm.

In certain embodiments, the method of synthesis of the beta zeolite compositions includes addition of the CTAB to the zeolite precursors instead of direct addition to the original aluminosilicate mixture. In the methods of synthesis described here, the addition of the aqueous CTAB solution to the aluminosilicate mixture is avoided as such addition interferes with the formation of the nuclei and the crystallization of the zeolite, and fails to produce the nano-sized beta zeolite compositions. In the methods of synthesis described here, the aluminosilicate mixture is allowed to crystallize and form the nano-sized zeolite precursors before the addition of CTAB. So when the aqueous CTAB solution is added to the zeolite precursor, the nano-sized particles of the zeolite precursors organize around the CTAB, and thus mesoporosity is introduced into the zeolite compositions.

The step of addition of the CTAB to the zeolite precursor is carried out under alkaline conditions to modify the interaction between the zeolite precursors and CTAB. In certain embodiments, this step is carried under pH ranging from 10-14. The pH value is adjusted with 2-6 Molar hydrochloric acid. Under these pH conditions, the zeolite precursors are desilicated and mesoporous zeolites are generated around the CTAB template. The pH of the reaction mixture at this step favors the assembly of the nano-sized zeolite particles and promotes zeolite crystal growth. When the pH of the reaction mixture increases from a pH of 8 to a pH of 12, the surface area of the particles increases from 620 $m^2/g$ to 810 $m^2/g$. The pore volume and pore size of the particles also increase from 0.74 ml/g to 1.09 ml/g, and from 20 nm to 40 nm, respectively.

This method of synthesis of the zeolite compositions does not require the step of removal of alkali cations, as sodium or other cations, which are not introduced to form the initial aluminosilicate mixture. As the silica source is either fumed silica or colloidal silica, this method eliminates the need for a subsequent ion-exchange step. Moreover, these methods also eliminate the need to increase the acidity of the zeolite before presenting the zeolite precursors to the CTAB solution. As several steps from a conventional zeolite process are eliminated, the cost of synthesis of the zeolites decreases and there is an increase in the yield of the zeolites.

Example 1

Different zeolite compositions were prepared to evaluate the effect of changes in the process steps. Fumed silica (Aerosil® 200), aluminum powder, and tetraethylammonium hydroxide (TEAOH) (Aldrich, 35% aqueous solution) were used as the silica source, the aluminum source, and the template or the structure directing agent, respectively. The aluminum powder was dissolved in a portion of TEAOH-containing aqueous solution to form a clear solution. The prepared mixture was then added to a slurry containing fumed silica and the remaining portion of the TEAOH-containing aqueous solution to form the first templated mixture. The aluminosilicate mixture contains a silica to aluminum ratio of 25, water to aluminum ratio of 350, and TEAOH to silica ratio of 0.6. The formed aluminosilicate fluid gel was stirred at ambient temperature for 4 hours. Certain samples 1 and 2 were subject to hydrothermal treatment in PTFE lined stainless steel autoclave for two days at 140° C. to form the zeolite precursors. Sample 1 (labelled as ZM-1) was maintained in a static state in the autoclave for two days, and Sample 2 (labelled as ZM-2) was maintained under constant rotation in the autoclave for two days. These samples represent reference samples prepared by conventional synthesis methods. Samples 3, 4, and 5 were prepared by subjecting the aluminosilicate fluid gel to a two-step drying process. Samples 3 and 4 were first dried for 24 hours at 100° C., and Sample 5 was first dried for 48 hours at 100° C., before being transferred to a PTFE lined stainless steel autoclave for two days at 140° C. to form the zeolite precursors. Sample 3 (labelled as ZM-3) was prepared by maintaining the aluminosilicate fluid gel in the autoclave at 140° C. for 24 hours under a static condition. Sample 4 (labelled as ZM-4) was prepared by maintaining the aluminosilicate fluid gel in the autoclave at 140° C. for 24 hours under constant rotation. Sample 5 (labelled as ZM-5) was prepared by maintaining the aluminosilicate fluid gel in the autoclave at 140° C. for 48 hours under constant rotation.

The dried mixtures from the autoclave step was added to an aqueous solution of CTAB and subjected to stirring at room temperature for 10-24 hours to form a CTAB templated mixture. For all samples, the CTAB templated mixture had a CTAB to silica-aluminum ratio of 0.4 and a water to silica ratio of 127. The pH of the mixture was maintained at a pH of 10 using 6 Molar hydrochloric acid and the CTAB templated mixture was transferred to the autoclaves to be maintained at 150° C. for 2 days. For all experiments, the crystallized CTAB-templated zeolites were removed from the autoclave, and then washed with distilled water. The CTAB-templated zeolites were separated from the water by centrifugation. The solid zeolite products were then dried at 100° C. overnight, and calcined at 600° C. for 4 hours. The experimental results of the samples are presented below in Table 1. The average pore sizes were determined from the surface area using Brunauer-Emmett-Teller technique and pore volume. Pore sizes may be larger than particle sizes in certain compositions as the void spaces of the nano-sized particles also contributes to the mesoporosity.

TABLE 1

| Sample name | ZM-1 | ZM-2 | ZM-3 | ZM-4 | ZM-5 |
|---|---|---|---|---|---|
| Movement during formation of zeolite precursor | Static | Rotated | Static | Rotated | Rotated |
| Particle size from TEM, nm | 500 | 50 | 80 | 30 | 30 |
| Drying in an oven | No | No | Yes, 24 hours | Yes, 24 hours | Yes, 48 hours |
| Phase from XRD | Beta | Beta | Beta | Beta | Beta |
| Surface area (m²/g) | 566 | 517 | 580 | 789 | 780 |
| Pore volume (ml/g) | 0.53 | 0.96 | 0.74 | 0.98 | 1.02 |
| Average pore size (nm) | 18.8 | 37.2 | 18.9 | 54.3 | 56.0 |
| Mesopore/total pore ratio, % | 22.6 | 23.7 | 65.8 | 66.4 | 66.2 |
| Product yield, weight percent (wt %) | 50% | 30% | 88% | 85% | 85% |

As shown in Table 1, the zeolites prepared via conventional synthesis method (ZM-1 and ZM-2), the average pore sizes, pore volume, mesopore/total pore ratio, and product yields were much less than zeolites prepared via the methods disclosed here (ZM-3, ZM-4, and ZM-5). The rotation during the crystallization of the first templated mixture facilitated the reduction of the particle sizes and the increase in the pore sizes, but did not significantly affect the mesopore formation and product yields.

In order to compare the performance of the zeolites, hydrocracking catalysts were prepared with ZM-1, ZM-2, and ZM-5. The formed zeolite was mixed with large-pore alumina (for example, PURALOX® TH100/150 with a pore volume of 0.96 mL/g and specific surface area of 201.6 m²/g, available from Sasol Performance Chemicals, Anckelmannsplatz 1, 20537 Hamburg, Germany), molybdenum oxide, nickel nitrate hexahydrate, and a binder (for example, partially acid-peptized alumina, such as CATAPAL® B available from Sasol Performance Chemicals, Anckelmannsplatz 1, 20537 Hamburg, Germany). This mixture was then extruded to form cylindrically-shaped extrudate, and dried at 383 K overnight. The extruded catalysts were then calcined in air at 773 K for 4 hours. Molybdenum oxide, nickel oxide, alumina, and beta zeolite in the extruded catalysts were present at 15 wt %, 5 wt %, 30 wt %, and 50 wt %, respectively. The catalysts were used in hydrocracking process in a micro-reactor system with hydrotreated Arab light crude as the feedstock. Reaction conditions in the micro-reactor system include a reaction temperature of 390° C., pressure of 150 bar, a ratio of the hourly volume of oil processed to the volume of catalyst (liquid hourly space velocity) of 1 per hour, and hydrogen to oil volume ratio of 1200. Certain properties of the feed and product streams following hydrocracking using the different catalysts are shown in Tables 2 and 3.

TABLE 2

| | Feed stream | Product Stream | | |
|---|---|---|---|---|
| | | Catalyst used | | |
| Property | — | ZM-1 | ZM-2 | ZM-5 |
| Density, ml/g | 0.8306 | 0.7886 | 0.7884 | 0.776 |
| Sulfur content | 73 | 12 | 5.3 | 4.2 |
| Nitrogen content | 5 | <1 | <1 | <1 |

TABLE 3

| | Feed stream | Product Stream | | |
|---|---|---|---|---|
| | | Catalyst used | | |
| Product yields, wt % | — | ZM-1 | ZM-2 | ZM-5 |
| C1 fraction | — | 0.1 | 0.1 | 0.2 |
| C2-C4 fraction | — | 5.5 | 5.1 | 22.0 |
| C5-180° C. fraction | 19.9 | 55.0 | 58.0 | 60.0 |
| 180-360° C. range fraction | 41.1 | 27.5 | 26.8 | 12.4 |
| 360-540° C. range fraction | 30.0 | 7.0 | 5.4 | 2.4 |
| >540° C. range fraction | 9.0 | 4.4 | 3.2 | 0 |

The feedstock for this hydrocracking process contained 80 weight percent of components with a boiling point ranging from 180° C.-540° C. and about 39 weight percent of components as the 360° C.+ fraction. As shown in Table 3, the nano-sized mesoporous zeolite composition exhibits greater activity in conversion of the 360° C.+ fraction to the lighter fractions, as compared to zeolite catalysts prepared by traditional methods (ZM-1 and ZM-2 catalysts). The product stream in systems that utilized the ZM-1 and ZM-2 catalysts contained about 11.4 wt % and 8.6 wt % of the 360° C.+ fraction, while the product stream in the system that utilized the ZM-5 catalyst contained only about 2.4 wt % of the 360° C.+ fraction. The product stream in systems that utilized the ZM-1 and ZM-2 catalysts contained about 5.6 wt % and 5.2 wt % of the C1-C4 fractions, while the product stream in the system that utilized the ZM-5 catalyst contained about 22.2 wt % of the C1-C4 fractions. Thus, the nano-sized mesoporous zeolite compositions were better suited for hydrocracking reactions due to the smaller particle sizes and greater mesoporosity of the zeolites.

It should be understood that any two quantitative values assigned to a property may constitute a range of that property, and all combinations of ranges formed from all stated quantitative values of a given property are contemplated in this disclosure. Having described the subject matter of the present disclosure in detail and by reference to specific embodiments, it is noted that the various details described in this disclosure should not be taken to imply that these details relate to elements that are essential components of the various embodiments described in this disclosure, even in cases where a particular element is illustrated in each of the drawings that accompany the present description. Further, it will be apparent that modifications and variations are possible without departing from the scope of the appended claims.

What is claimed is:

1. A method for synthesizing a nano-sized mesoporous zeolite composition, the method comprising:
   mixing silica, a source of aluminum, and tetraethylammonium hydroxide to form an aluminosilicate fluid gel;
   drying the aluminosilicate fluid gel to form a dried gel mixture;
   subjecting the dried gel mixture to hydrothermal treatment to produce a zeolite precursor;
   adding cetyltrimethylammonium bromide (CTAB) to the zeolite precursor to form a templated mixture;
   subjecting the templated mixture to hydrothermal treatment to prepare a CTAB-templated zeolite;
   washing the CTAB-templated zeolite with distilled water;
   separating the CTAB-templated zeolite by centrifugation; and
   drying and calcining the CTAB-templated zeolites to produce a nano-sized mesoporous zeolite composition.

2. The method of claim 1, wherein the silica is fumed silica.

3. The method of claim 1, wherein the silica is colloidal silica.

4. The method of claim 1, wherein the source of aluminum is aluminum oxide.

5. The method of claim 1, wherein the source of aluminum is aluminum powder.

6. The method of claim 1, wherein the dried gel mixture is subject to hydrothermal treatment in an autoclave at a temperature ranging from 100° C. to 150° C. to produce a zeolite precursor.

7. The method of claim 6, wherein the dried gel mixture is subject to hydrothermal treatment under constant rotation to produce a zeolite precursor.

8. The method of claim 1, wherein the zeolite composition is a mesoporous beta zeolite in a proton form.

9. The method of claim 1, wherein the zeolite composition has a pore size between 2 and 60 nanometers and a particle size of less than 60 nanometers.

* * * * *